L. Y. COCHRAN & W. I. LINDSAY.
FURNACE FUEL FEEDER.
No. 10,942. Reissued July 10, 1888.
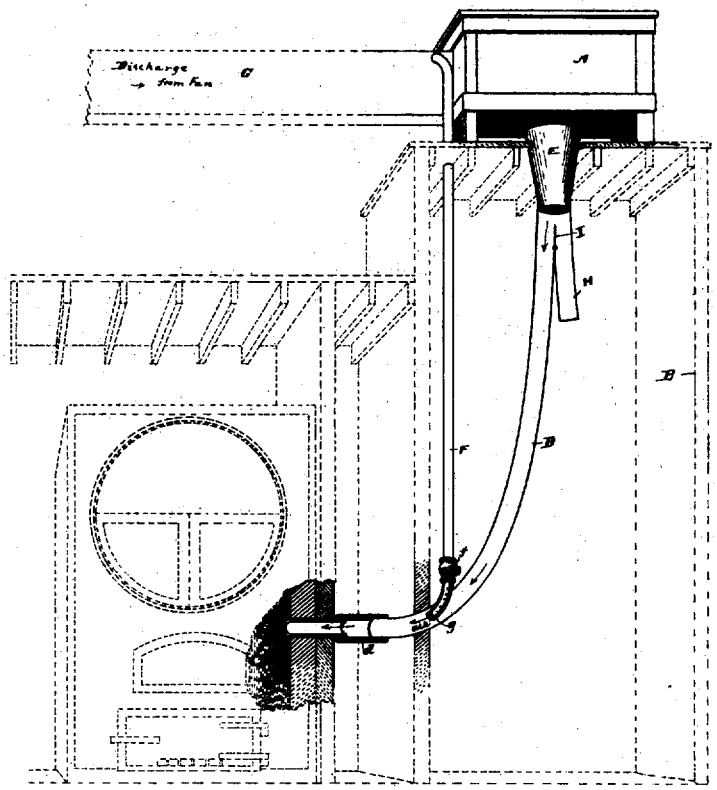
WITNESSES:
N. S. Amstutz
Geo. W. Kenny
L. Y. Cochran,
W. I. Lindsay. INVENTORS.
BY Leggett & Leggett.
ATTORNEYS.
THE NORRIS PETERS CO., PHOTO-LITHO., WASHINGTON, D. C.

UNITED STATES PATENT OFFICE.

LOYAL Y. COCHRAN, OF ALLEGHENY CITY, PENNSYLVANIA, AND WILLIAM I. LINDSAY, OF CLEVELAND, OHIO.

FURNACE FUEL-FEEDER.

SPECIFICATION forming part of Reissued Letters Patent No. 10,942, dated July 10, 1888.

Original No. 368,813, dated August 23, 1887. Application for reissue filed April 24, 1888. Serial No. 271,749.

*To all whom it may concern:*

Be it known that we, LOYAL Y. COCHRAN, of Allegheny City, Allegheny county, Pennsylvania, and WILLIAM I. LINDSAY, of Cleveland, Cuyahoga county, Ohio, have invented certain new and useful Improvements in Furnace Fuel-Feeders, of which the following is a specification.

This invention relates to a device for feeding sawdust or shavings into steam-boiler or other furnaces; and it consists of the peculiar construction and combination of parts, as hereinafter described, and pointed out in the claim.

To accomplish the above-mentioned results, we construct the device substantially in the manner hereinafter described, and pointed out in the claim.

The figure represents a front elevation, part in section.

In the accompanying drawing is represented a steam-boiler furnace and a dust-and-shavings collector, showing our device attached for conveying the dust and shavings from the collector into the furnace.

A is a dust-and-shavings collector located on the top of a receiving-room, B.

C is a boiler-furnace and boiler located in a room adjacent to said receiving-room, but sufficiently separated therefrom to insure safety from fire communicating with the said receiving-room.

D is a pipe or conductor connected with and leading downward from the discharge-spout E of the collector A, and through the side walls of the receiving-room and of the boiler-room, and also through the side-wall setting of the boiler-furnace, through which the dust and shavings are conveyed from the collector to the furnace. That portion of the pipe which enters the furnace-wall is made of cast-iron capable of resisting the heat, and the portion of the pipe between the two walls of the receiving-room and the boiler-room is made separable by means of a sleeve, *d*, fitted to slide onto the projecting portion of the cast-iron pipe. It may be slid back onto end of pipe D to separate it from the cast-iron portion, and a cap, cover, or valve placed on the said cast-iron portion, if desired.

To insure a forcible discharge of the dust and shavings from the pipe or conductor D and their distribution over the fire in the furnace, a branch pipe, F, is provided, leading down from the discharge-pipe G from the fan and into the lower portion of the pipe D, and having an elbow, *g*, turned toward the discharge end of said pipe D, for the purpose of producing a current of air therein, for drawing the dust and shavings downward and forcibly discharging them into the fire-place; also keeps the feed-pipe from heating. Pipe F has a cock, *f*, for regulating or shutting off the blast in said pipe.

H is a branch pipe for conducting the dust and shavings into the room B, and there is provided a valve or gate, I, at the junction of pipes D and H, whereby the direction of the dust and shavings may be changed or controlled to pass either into pipe D or pipe H, as may be required, or part either way at same time.

The construction of the dust-and-shavings collector is such that the blast of air from the fan is spent therein and escapes out at a top opening, (not shown,) while the dust and shavings fall gently through the spout E, and are taken therefrom and conveyed to the furnace.

The great advantages of this invention are that the dust and shavings are fed uniformly and steadily direct from the collector to the furnace, and at a great saving of the labor and expense of men for performing such work. The pipe F, although preferable, is not essential, as any other means for introducing a blast into pipe D would answer the purpose.

Having described our invention, we claim—

In fuel-feeders for furnaces, the combination, with the collector A, having discharge-pipe E, of conductor-pipe D, having branch H and regulating-valve I, and connecting the collector with the furnace, and with means for forcing air into the conductor for discharging the shavings into the furnace, substantially as and for the purpose specified.

LOYAL Y. COCHRAN.
WILLIAM I. LINDSAY.

Witnesses to the signature of L. Y. Cochran:

JOHN LOGAN,
SAML. G. MCALLISTER.

Witnesses to the signature of W. I. Lindsay:

ALBERT E. LYNCH,
M. D. LEGGETT.